Dec. 24, 1957 J. D. FLEMING ET AL 2,817,562
COATED PISTON
Filed July 1, 1953
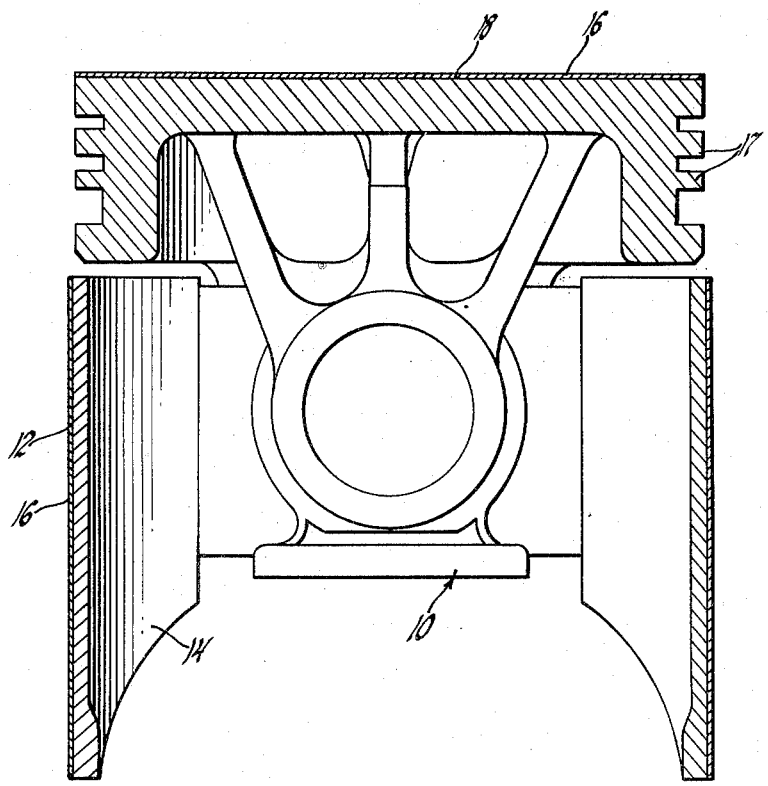
INVENTOR
James D. Fleming &
BY Arnold DeHart
ATTORNEY 2,817,562
Patented Dec. 24, 1957

2,817,562
COATED PISTON

James D. Fleming and Arnold O. De Hart, Detroit, Mich., assignors to General Motors Corporation, Detroit, Mich., a corporation of Delaware Application July 1, 1953, Serial No. 365,383

6 Claims. (Cl. 309—4)

This invention relates to pistons for reciprocating machines and particularly to pistons which are coated with polytetrafluoroethylene to reduce the sliding friction between the piston and cylinder wall surfaces, provide desirable insulating properties, and inhibit the deposition of carbonaceous materials on the end face of the piston.

In reciprocating machines, such as modern high speed internal combustion engines, it is desirable to reduce rubbing or sliding friction between the walls of the cylinders and pistons to the greatest possible extent. Such a reduction in friction not only results in decreasing the amount of wear between the parts but also increases the efficiency of the engine or other machine.

Accordingly, a principal object of this invention is to provide a piston for a reciprocating machine which is coated in such a manner as to substantially reduce the sliding friction between the piston skirts and the walls of the cylinder in which it reciprocates. A further object of the invention is to provide, especially for internal combustion engines, such a coated piston which retains its coating under operating conditions for an almost unlimited period of time.

These and other objects and advantages are attained in accordance with the present invention with a piston which has portions of its outer surfaces provided with a thin, hard and tough coating of polytetrafluoroethylene. A coated piston of this type is inexpensively formed since the coating may be easily and quickly applied by either spraying or dipping, the coating functioning equally well on cast iron, aluminum or other metallic pistons. As hereinbefore indicated, the use of this coating on the outer surfaces of the side walls or piston measurably reduces the sliding friction between the cylinder walls and piston skirts, thus increasing the efficiency of the engine or other machine in which it is used. Furthermore, the polytetrafluoroethylene coating is chemically inert and does not adversely affect lubricating oils or the metallic surfaces of pistons or cylinders. When the end face of a piston is coated with polytetrafluoroethylene, in accordance with a preferred modification of the invention, the resultant coating aids in reducing the thermal conductivity of the piston face because of its thermal insulating properties. Hence a piston having a polytetrafluoroethylene-coated end face will tend to run cooler than an uncoated piston formed of the same material.

Other objects and advantages of this invention will more fully appear from the following detailed description of a preferred embodiment of the invention, reference being made to the accompanying drawing showing a sectional view of an internal combustion engine piston coated with a layer of polytetrafluoroethylene in accordance with the invention.

Referring more particularly to the drawing, there is shown a metallic piston, indicated generally by 10, of an internal combustion engine. In accordance with one aspect of our invention, the outer cylinder-contacting surfaces 12 of the side walls or skirts 14 of the piston are provided with a hard, thin coating 16 of polytetrafluoroethylene which substantially reduces friction between the piston skirts and adjacent cylinder walls. It will be appreciated, of course, that the thickness of the polytetrafluoroethylene coating is greatly exaggerated in the drawing for purposes of clarity and that such a coating should not be more than approximately 0.007 inch thick.

Likewise, while the coating is shown as applied to only the skirt portion of the outer, cylindrical, side surfaces of the piston, it should also be understood that it may be more convenient in some instances to coat all the side surfaces of the piston. The determination of whether or not all the outer side surfaces of the piston are to be coated would be dependent to a great extent on the method of applying the polytetrafluoroethylene. If a dipping method is used, as will be hereinafter more fully explained, all the piston surfaces usually will become coated, while spraying the coating on the piston will not necessarily result in coating side wall surfaces other than those which contact the cylinder walls. In most pistons for internal combustion engines, the diameter or lateral extension of the portion 17 of the piston adjacent the piston rings is less than the diameter or lateral extension of the skirts 14, as shown in the drawing, and the former normally does not contact the cylinder walls. Hence, although it may be convenient to do so, it is not necessary to coat the surfaces of the portion 17, although this may advantageously be done if this portion has the same approximate diameter as the skirts. As indicated above, however, the chemical inertness of polytetrafluoroethylene prevents it from detrimentally affecting adjacent parts even if the entire piston is coated.

In the case of internal combustion engines, where burning gases are in contact with the end of the piston, we have also found it advantageous to apply the polytetrafluoroethylene coating to the head end face 18 of the piston. As hereinbefore indicated, such a coating reduces the amount of heat conducted from the adjacent combustion chamber to the piston and also serves to reduce the amount of carbonaceous material deposited on the end face of the piston during combustion of the air-fuel mixture.

If any rust, grease, organic coatings or dirt is initially present on the piston surfaces to be coated, such foreign matter should be carefully removed by first sanding, followed by washing with a volatile solvent. Sand blasting should be done carefully to avoid excessive pitting of the piston, which preferably is formed of a ferrous metal. If the polytetrafluoroethylene is not used while still fresh, it is desirable to thoroughly agitate and filter it with a cloth filter before use to remove any small particles of coagulum which may be formed during storage.

We have found it most advantageous to apply polytetrafluoroethylene to the piston surfaces in the form of a low-viscosity dispersion in a water medium. The coating is preferably applied at room temperature, rather than being first heated, thereby preventing the water from evaporating too rapidly. Too rapid evaporation would result in unequal distribution of the polytetrafluoroethylene and hence an unequal coating thickness on the piston.

In order to provide optimum results with a polytetrafluoroethylene-coated piston, the surfaces of the piston should be prepared and cleaned, as indicated above, and the polytetrafluoroethylene applied as a very thin layer. This is most conveniently and satisfactorily done by spraying. The coating on the piston surfaces should then be dried, preferably at a temperature below approximately 200° F., until the water is evaporated. Either air drying at room temperature or oven drying is satisfactory. Following the drying operation, the polytetrafluoroethylene-coated piston should be baked at a temperature of at least approximately 750° F. until sintering of the polytetrafluoroethylene occurs. We have found that an exceptionally hard coating may be obtained if the coated piston, after sintering and while still hot, is immediately immersed in water.

If desired, several coats of polytetrafluoroethylene may be applied to the surfaces of the piston, it being preferable to repeat the above-described drying and baking steps between the application of the polytetrafluoroethylene layers. Moreover, in most instances, in order to obtain proper adhesion of subsequent parting layers to the piston surfaces it is usually desirable to initially apply a polytetrafluoroethylene priming layer. When such a priming coating is used, it likewise should be dried at a temperature below approximately 200° F. and baked at a temperature in excess of 750° F. until sintered. Then the final layer or layers of polytetrafluoroethylene may be applied to the piston in the above-described manner. In general, in order to obtain optimum toughness and durability, it is preferable to use several layers of polytetrafluoroethylene to obtain the proper coating thickness, rather than to apply one thicker coat. Too thick a single layer results in the rough, irregular condition known as "orange peel."

An example of a polytetrafluoroethylene primer which may be used is Dupont Teflon Prime 850–201, while Dupont Clear Finish 852–201 may be used as the finish coating. In most instances, it is desirable to use two coats of the latter material over the priming layer.

While satisfactory results may be obtained if the average thickness of the tetrafluoroethylene polymer coat, or the average total thickness of the plurality of coats if more than one polytetrafluoroethylene application is used, ranges from about 0.001 to 0.005 inch, it is preferred in most instances to have a coating thickness between approximately 0.0015 inch and 0.0025 inch. If a primer layer is used, the thickness of this priming layer will be about 0.0002 inch to 0.0005 inch.

Although the surface layer of polytetrafluoroethylene frequently may be applied by brush coating or dip coating, in general it is most advantageous if the polytetrafluoroethylene is applied by spraying. A fine mist momentarily directed onto the piston surfaces provides an evenly distributed coating which materially reduces sliding friction, since water dispersions of polytetrafluoroethylene are low-viscosity liquids capable of being easily sprayed. Upon contact with the surfaces of the piston the water rapidly evaporates, leaving a very thin, evenly distributed layer or film of polytetrafluoroethylene on the piston. This layer is then fused, as hereinbefore explained. When spray coating, five to ten pounds pressure on the fluid feed and 35 to 50 pounds on the air will generally be satisfactory. The air outlet should be maintained a sufficient distance from the surface of the piston to prevent blowing the wet film into ripples.

The priming coat normally dries relatively slowly, however, and after a few moments at room temperature, may be subjected to gentle heating at a temperature not in excess of approximately 200° F. in an oven or by other suitable means. The source of heat should be sufficiently distant from the piston to prevent blistering the wet polytetrafluoroethylene film. Although satisfactory results are generally provided if the surface temperature of the piston is maintained below the boiling point of water while applying successive layers of the coating, it is usually preferable, in order to avoid dry overspray and consequently a rough film, to reduce the piston temperature to approximately 120° F.

Under certain conditions, a very uniform layer of polytetrafluoroethylene may be obtained by dip coating. In coating in the manner, it is necessary to remove all bubbles from the surface of the polytetrafluoroethylene and to prevent any bubbles from being trapped on the coated piston surfaces. As compared with spray coating of polytetrafluoroethylene, when this material is used as a dip coat it is desirable to reduce its viscosity by adding distilled water, a reduction of approximately 20% providing good results. Normally brush coating of polytetrafluoroethylene is not advisable inasmuch as polytetrafluoroethylene is subject to coagulation due to mechanical working.

After the final bake or after each sintering step and while still hot, it is desirable in most instances to immediately quench the polytetrafluoroethylene-coated piston in water since a quenched film is tougher, harder, and more durable than one which has been cooled slowly. Likewise, if it is desired to reduce the temperature rapidly to facilitate application of the succeeding coat, quenching with cold water may be done immediately after the fusing of each coat.

Tests on pistons coated in the above-described manner with tetrafluoroethylene indicate that such coated pistons can be used over greatly extended periods of time under normal operating conditions without detrimental effects on the heat-stable polytetrafluoroethylene coating. For example, we have used these coated pistons in test engines which were run for approximately 10,000 miles, and at the end of this period examination of the pistons showed that the friction-reducing coating was still intact. The anti-friction properties of polytetrafluoroethylene-coated pistons were also tested in a friction test engine and compared with uncoated pistons. The results of such tests showed that use of pistons which were coated with polymerized tetrafluoroethylene resulted in an average of approximately 4% less engine friction than conventional, uncoated pistons used in the same engine under similar conditions.

It is to be understood that, while our invention has been described by means of certain specific examples, the scope of the invention is not to be limited thereby except as defined in the following claims.

We claim:

1. In an internal combustion engine, a metal piston having a hard, durable coating of sintered polytetrafluoroethylene bonded to the outer surfaces of its generally cylindrical side walls, said coating having a thickness of approximately 0.0015 inch to 0.0025 inch.

2. A piston for an internal combustion engine, said piston having its cylinder-contacting surfaces and end face coated with a plurality of thin layers of polytetrafluoroethylene, the total thickness of said layers being between 0.001 inch and 0.005 inch.

3. In an internal combustion engine, a metal piston having its cylinder-contacting surfaces characterized by low frictional properties, said surfaces being provided with an adherent coating consisting of a priming layer of sintered polytetrafluoroethylene having a thickness between 0.0002 inch and 0.0005 inch and a plurality of finishing layers of sintered polytetrafluoroethylene, the total thickness of said layers being between approximately 0.001 inch and 0.005 inch.

4. A piston for an internal combustion engine, said piston characterized by improved resistance to build-up of carbonaceous deposits on its head end face, said piston having a priming layer of polytetrafluoroethylene securely adhering to the outer surfaces of its head end wall, said priming layer having a thickness between 0.0002 inch and 0.0005 inch, and two finishing layers of polytetrafluoroethylene on the surface of said priming layer, the total thickness of said three layers being approximately 0.001 inch to 0.005 inch.

5. The piston set forth in claim 4 in which the outer cylinder-contacting surfaces of the side walls of the piston are also coated with priming and finishing layers of polytetrafluoroethylene to reduce friction between said piston and the cylinder in which it reciprocates.

6. In an internal combustion engine, a metal piston having its cylindrical-contacting outer surfaces provided with a hard coating of polytetrafluoroethylene, said coating having a thickness of approximately 0.001 inch to 0.005 inch and being securely bonded directly to said surfaces throughout its area of contact therewith.

References Cited in the file of this patent

UNITED STATES PATENTS

| | | |
|---|---|---|
| 2,411,159 | Hanford | Nov. 19, 1946 |
| 2,440,190 | Alfthan | Apr. 20, 1948 |
| 2,520,173 | Sanders | Aug. 29, 1950 |
| 2,607,342 | Abel | Aug. 19, 1952 |

FOREIGN PATENTS

| | | |
|---|---|---|
| 657,080 | Great Britain | Sept. 12, 1951 |

OTHER REFERENCES

Teflon, V. F. Lantz et al., Industrial and Engineering Chemistry, August 1952, pp. 1801–1805.